(12) United States Patent
Desjoyeaux et al.

(10) Patent No.: US 11,427,299 B2
(45) Date of Patent: Aug. 30, 2022

(54) CELL STRUCTURE AND ACOUSTIC ATTENUATION DEVICE FOR A NACELLE OF AN AIRCRAFT PROPULSION ASSEMBLY

(71) Applicants: Safran Nacelles, Gonfreville l'Orcher (FR); Safran Ceramics, Le Haillan (FR)

(72) Inventors: Bertrand Desjoyeaux, Moissy Cramayel (FR); Davi Silva De Vasconcellos, Moissy Cramayel (FR); Florent Bouillon, Moissy Cramayel (FR); Arnaud Delehouze, Moissy Cramayel (FR)

(73) Assignees: Safran Nacelles, Gonfreville l'Orcher (FR); Safran Ceramics, Le Haillan (FR)

( * ) Notice: Subject to any disclaimer, the term of this patent is extended or adjusted under 35 U.S.C. 154(b) by 284 days.

(21) Appl. No.: 16/800,211

(22) Filed: Feb. 25, 2020

(65) Prior Publication Data

US 2020/0189717 A1 Jun. 18, 2020

Related U.S. Application Data

(63) Continuation of application No. PCT/FR2018/052091, filed on Aug. 22, 2018.

(30) Foreign Application Priority Data

Aug. 25, 2017 (FR) ..................................... 17/57894

(51) Int. Cl.
*B64C 7/02* (2006.01)
*B64C 1/40* (2006.01)
(Continued)

(52) U.S. Cl.
CPC .................. *B64C 7/02* (2013.01); *B64C 1/40* (2013.01); *B64C 21/02* (2013.01); *B64D 2033/0206* (2013.01)

(58) Field of Classification Search
CPC .. B64C 1/40; B64C 7/02; B64C 21/02; B64C 1/12
See application file for complete search history.

(56) References Cited

U.S. PATENT DOCUMENTS 3,597,891 A * 8/1971 Martin .................... B62D 29/04
52/794.1
3,831,710 A * 8/1974 Wirt ........................ B32B 15/08
428/116

(Continued)

OTHER PUBLICATIONS

International Search Report for International Application PCT/FR2018/052091, dated Dec. 11, 2018.

*Primary Examiner* — Michael H Wang
(74) *Attorney, Agent, or Firm* — Burris Law, PLLC

(57) ABSTRACT

The present disclosure relates to a cell structure for an acoustic attenuation device for a nacelle of an aircraft propulsion assembly. This cell structure includes lateral partitions forming channels that each extend between a first end and a second end and skin elements arranged so that each channel is at least partly closed at the first end thereof by at least one skin element. Each skin element is connected to a respective lateral partition and can move relative to the other lateral partitions. A continuous skin can be assembled on this cell structure so as to at least partly close the channels at the second end thereof and to thus form an acoustic attenuation device.

19 Claims, 5 Drawing Sheets

(51) Int. Cl.
 *B64C 21/02* (2006.01)
 *B64D 33/02* (2006.01)

(56) References Cited

U.S. PATENT DOCUMENTS

| | | | | |
|---|---|---|---|---|
| 3,887,031 | A * | 6/1975 | Wirt | G10K 11/172 181/292 |
| 4,373,608 | A * | 2/1983 | Holmes | F16F 7/10 181/208 |
| 5,241,512 | A * | 8/1993 | Argy | G10K 11/172 181/207 |
| 6,122,892 | A * | 9/2000 | Gonidec | B32B 3/12 428/116 |
| 6,536,556 | B2 * | 3/2003 | Porte | E04C 2/365 181/291 |
| 8,047,329 | B1 * | 11/2011 | Douglas | G10K 11/172 181/292 |
| 2009/0014234 | A1 * | 1/2009 | Bagnall | G10K 11/172 181/214 |
| 2013/0186707 | A1 * | 7/2013 | Richter | F02K 1/827 181/292 |
| 2015/0060194 | A1 * | 3/2015 | Pongratz | F02C 7/24 181/286 |
| 2015/0353210 | A1 * | 12/2015 | Litwinski | C22F 1/006 148/563 |
| 2019/0103089 | A1 * | 4/2019 | Prakash | B32B 7/02 |
| 2022/0024555 | A1 * | 1/2022 | Penn | B29C 66/727 |

\* cited by examiner

CELL STRUCTURE AND ACOUSTIC ATTENUATION DEVICE FOR A NACELLE OF AN AIRCRAFT PROPULSION ASSEMBLY

CROSS-REFERENCE TO RELATED APPLICATIONS

This application is a continuation of International Application No. PCT/FR2018/052091, filed on Aug. 22, 2018, which claims priority to and the benefit of FR 17/57894, filed on Aug. 25, 2017. The disclosures of the above applications are incorporated herein by reference.

FIELD

The present disclosure relates to the field of acoustic treatment of aircraft propulsion unit nacelles.

BACKGROUND

The statements in this section merely provide background information related to the present disclosure and may not constitute prior art.

In the state of the prior art, it is known to attenuate the noise generated by an aircraft turbojet engine or an aircraft turbomachine using acoustic panels. An acoustic panel typically comprises two skins and a cellular structure of the honeycomb type clasped between the two skins. One of the skins, oriented towards the noise source, is air permeable in order to capture the acoustic waves and to reduce the acoustic energy within the cellular structure. In particular, the ejection cone or the primary nozzle of an exhaust conduit is typically equipped with such acoustic panels.

Considering the thermal stresses to which an exhaust conduit is subjected and the cost of ceramic materials, it is desirable to make acoustic panels intended for such applications by integrating both ceramic materials and metal components, the latter being less expensive.

Nonetheless, these different materials expand differently and at different temperatures in the environment in which the parts are used, which can introduce unacceptable mechanical stresses between the skins and the cellular structure of such an acoustic panel.

SUMMARY

This section provides a general summary of the disclosure and is not a comprehensive disclosure of its full scope or all of its features.

The present disclosure provides an acoustic attenuation device limiting the thermomechanical stresses induced by temperature fields and the difference in thermal expansion coefficient of the different materials composing the device.

To this end, the present disclosure relates, according to a first aspect, to a cellular structure for an acoustic attenuation device for an aircraft propulsion unit nacelle. This structure comprises lateral partition walls forming channels each extending between a first end and a second end.

According to the present disclosure, this structure comprises skin elements arranged so that each channel is at least partially closed at its first end by at least one skin element.

The cellular structure of the present disclosure therefore comprises several skin elements distinct from each other.

In other words, each channel may be at least partially closed at its first end by at least one skin element:

specific to the channel, that is to say at least partially closing only the channel, or specific to the channel and to one or several channel(s) adjacent to the channel.

In other words, a first channel is at least partially closed at its first end by at least one first skin element and a second channel is at least partially closed at its first end by at least one second skin element, said at least one second skin element being different from the at least one first skin element. In this example, if said second channel is adjacent to said first channel, said second channel may be partially closed at its first end by said at least one first skin element.

According to the present disclosure, each skin element is connected to a respective lateral partition wall and is movable relative to the other lateral partition walls.

In the above expression, the term "respective" means that a given skin element is connected to one and only one lateral partition wall and vice versa.

In this document, the term "movable" is defined as "capable of being displaced." In other words, a skin element connected to a lateral partition wall is not fastened to the other lateral partition walls of the cellular structure. In particular, a skin element connected to a lateral partition wall of a channel is not fastened to the other lateral partition walls of the channel so that the skin element can be displaced relative to these other lateral partition walls, at least along a longitudinal direction along which the skin element extends. Such a longitudinal mobility can be caused by thermal expansion of the cellular structure.

According to a first variant, each skin element may be fastened to a respective lateral partition wall, for example by welding or riveting or bolting or crimping or gluing.

According to a second variant, each skin element may constitute one single piece, with the lateral partition wall to which it is connected.

In one form, each channel may be at least partially closed at its first end by a first skin element and a second skin element.

In another form, for each channel, said first skin element and said second skin element can, at least partially, be superimposed.

In another form, a portion of a skin element of a first channel may cover a portion of at least one other skin element of at least one second channel adjacent to the first channel.

A skin element thus partially covered by another skin element can thus:

be held by the other skin element against lateral partition walls of the corresponding channel, that is to say immobilized in a transverse direction of the cellular structure along which the channels extend, slip in the longitudinal direction of the cellular structure, relative to the lateral partition walls to which it is not fastened, for example under the effect of a differential thermal expansion of the skin element and the lateral partition walls.

In one form, for at least one portion of the lateral partition walls, each lateral partition wall can delimit two adjacent channels.

In one aspect, the skin elements form a discontinuous skin, the discontinuous skin, in one form, being arranged to at least partially close all of the channels at their first end.

In another aspect, each channel may be delimited by at least four lateral partition walls. In one form, each channel may be delimited by at least six lateral partition walls.

In still another aspect, the cellular structure may be arranged so that two adjacent lateral partition walls of two respective adjacent channels are not coplanar, and in one form, at least in the vicinity of a connection area between these channels.

Such an arrangement makes it possible to avoid the continuity of mechanical stresses from one lateral partition wall to another lateral partition wall, and promotes flexibility and relaxation of the cellular structure when the latter is subjected to thermal stresses.

In one form, for each channel, at least one lateral partition wall may comprise corrugated walls or angled facets therebetween. In one example, a plurality of lateral partition walls comprise corrugated walls or angled facets therebetween.

Such corrugated partition walls or angled facets therebetween amplify the capacity of the cellular structure to absorb thermal expansions by limiting the mechanical stresses induced in the structure.

Each channel may, in one form, constitute a portion of a Helmholtz cavity arranged to attenuate a noise generated by a propulsion unit (turbojet engine or turbomachine) of an aircraft when the channel is at least partially closed at its second end.

According to a second aspect, the present disclosure concerns an acoustic attenuation device for an aircraft propulsion unit nacelle, the device comprising, on the one hand, a cellular structure as defined hereinabove and, on the other hand, a continuous skin at least partially closing the channels of the cellular structure at their second end.

Such an acoustic attenuation device limits or inhibits the transmission of mechanical, thermomechanical and/or vibratory forces from one skin element to another skin element of the discontinuous skin since these skin elements are multiple and discontinuous, and reduces or cancels the phenomenon of differential thermomechanical expansion between the continuous skin and the discontinuous skin.

In addition, the cellular structure according to the present disclosure preserves or improves its conformability in comparison with a conventional cellular structure, which in particular enables it to be assembled with a non-planar continuous skin. A non-planar acoustic attenuation device is for example desired to equip or constitute all or part of an ejection conduit or of many other components of a nacelle of an aircraft turbojet engine or turbomachine or more generally propulsion unit.

According to a first variant, the continuous skin may be arranged to let acoustic waves penetrate into the channels of the cellular structure. For this purpose, the continuous skin may for example comprise orifices or a mesh. In other words, the continuous skin is in this case acoustically permeable.

According to this first variant, each channel constitutes a Helmholtz cavity having a cavity bottom constituted by at least one skin element of the discontinuous skin.

According to a second variant, at least one portion of the skin elements of the cellular structure may be arranged to let acoustic waves penetrate into the channels of the cellular structure. For this purpose, these skin elements may for example comprise orifices. In other words, the skin elements of the discontinuous skin are in this case acoustically permeable. According to this second variant, each channel constitutes a Helmholtz cavity having a cavity bottom constituted by said continuous skin.

The first variant may be desired for reducing the drag since the continuous skin can, as it forms a continuous outer surface, be provided with improved aerodynamic characteristics.

In one form, the cellular structure may comprise a metallic material and the continuous skin may comprise a composite material.

In this latter form, the cellular structure and the continuous skin may be glued to each other.

In another form, the cellular structure may comprise nickel or a nickel alloy, and the continuous skin may comprise a ceramic material.

A cellular structure made of nickel or nickel alloy can withstand very high temperatures.

In another form, the cellular structure may comprise titanium or a titanium alloy, and the continuous skin may comprise a ceramic material.

A cellular structure made of titanium or titanium alloy is lighter than a structure made of metal, the latter being more resistant. Nonetheless, a structure made of titanium or titanium alloy withstands relatively lower temperatures than a structure made of nickel or nickel alloy.

When the continuous skin comprises a ceramic material (or composite material with a ceramic matrix), the cellular structure and the continuous skin can be glued to each other with a ceramic glue. As example, the glue may be selected to provide pure chemical bonds between the elements to be glued or to achieve gluing by diffusion of a chemical element. The glue may contain ceramic fillers and binders which will create chemical bridges between the composite material, the metallic material and the powders of the glue. The sintering will end up giving a weak cohesion to the whole. It is also possible to use pre-ceramic resins, which can penetrate into porosities of the composite material.

In one form, at least one portion of the lateral partition walls may be arranged to improve the fastening of the cellular structure with the continuous skin. To this end, according to a first variant, lateral partition walls may comprise, at their second end, crenellations arranged to anchor in the glue. According to a second variant, lateral partition walls may comprise, at their second end, extending tabs folded parallel to the surface of the continuous skin on which the cellular structure is glued.

According to a third aspect, the present disclosure concerns an acoustic attenuation device for an aircraft propulsion unit nacelle, the device comprising:

a first cellular structure as defined hereinabove, a second cellular structure comprising channels each extending between a first end and a second end, at least one septum arranged to separate the first and the second cellular structure so as to at least partially close the channels of the first cellular structure at their second end and the channels of the second cellular structure at their first end, and a continuous skin at least partially closing the channels of the second cellular structure at their second end.

The at least one septum is, in one form, acoustically permeable. For this purpose, the at least one septum may for example comprise perforations or a porous material such as a mesh or a perforated sheet.

Hence, the present disclosure also covers a device with a double degree of acoustic attenuation.

According to a fourth aspect, the present disclosure also concerns an acoustic attenuation device for an aircraft propulsion unit nacelle, the device comprising two cellular structures according to the present disclosure and a continuous skin at least partially closing the channels of these two cellular structures at their second end. In one form, the skin elements of one of the cellular structures as well as the continuous skin can be arranged to let acoustic waves penetrate into the channels of the cellular structure, whereas the skin elements of the other cellular structure are acoustically impermeable. An effective acoustic attenuation device is thus created to attenuate two frequency ranges as it is exposed to acoustic waves along the discontinuous skin arranged to let the acoustic waves pass, and as the continuous skin is also arranged to let certain acoustic waves pass.

In one form, lateral partition walls and/or skin elements may comprise at least one orifice with a cross-section comprised between 1 and 4 mm², in order to promote the draining of fluids that might enter the cellular structure.

According to a fifth aspect, the present disclosure also concerns an aircraft propulsion unit nacelle comprising one or several acoustic attenuation device(s) and/or one or several cellular structure(s) as defined hereinabove.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
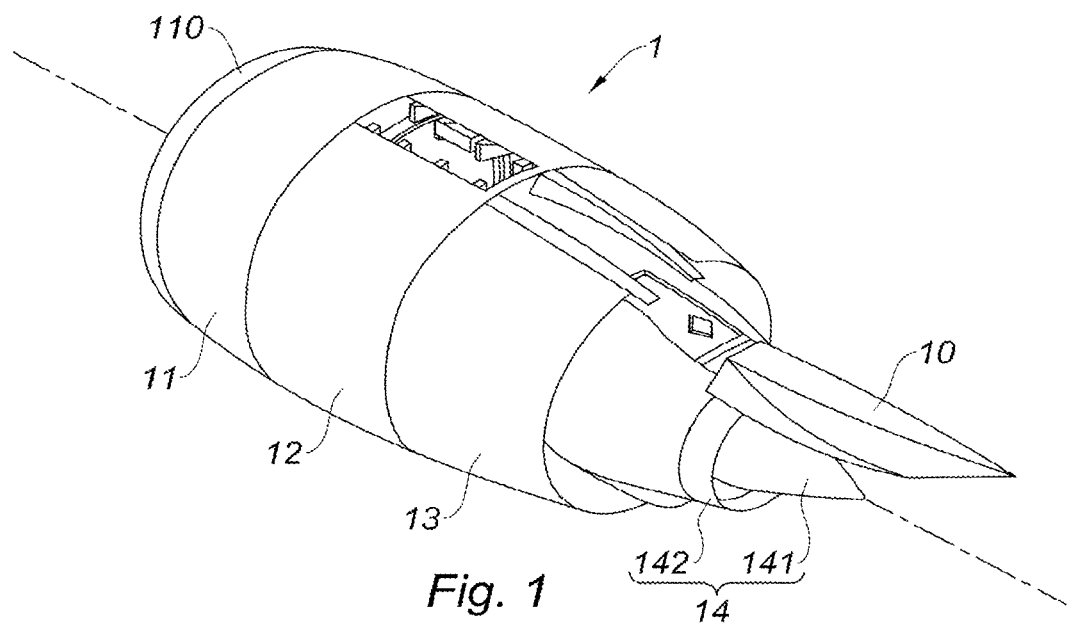
FIG. 1 is a schematic perspective view of an aircraft turbojet engine nacelle to which the teachings of the present disclosure are applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure proposes a cellular structure and an acoustic attenuation device for a propulsion unit nacelle, for example a turbojet engine or turbomachine, of an aircraft.

An example of an aircraft (not represented) turbojet engine (not represented) nacelle 1 is illustrated in FIG. 1. The nacelle 1 comprises a pylon 10 intended to be fastened to a wing (not represented) of the aircraft. The nacelle 1 comprises an upstream section 11 provided with a lip 110 forming an air inlet. The upstream section 11 is adapted to enable improved capture towards the turbojet engine of the air needed to supply a fan (not represented) and inner compressors (not represented) of the turbojet engine. The nacelle 1 also includes a middle section 12 receiving the fan as well as a downstream section 13. Under the pylon 10 and downstream of the turbojet engine, the nacelle 1 comprises an exhaust conduit 14 including a gas ejection cone 141 ("plug") and a primary nozzle 142 ("nozzle"). The ejection cone 141 and the primary nozzle 142 of the exhaust conduit 14 define a passage for a hot air flow exiting the turbojet engine.

The nacelle 1 and in particular the exhaust conduit 14 may comprise one or several acoustic attenuation device(s) and/or one or several cellular structure(s) as described hereinbelow with reference to FIG. 2 and following.

Figure 2:
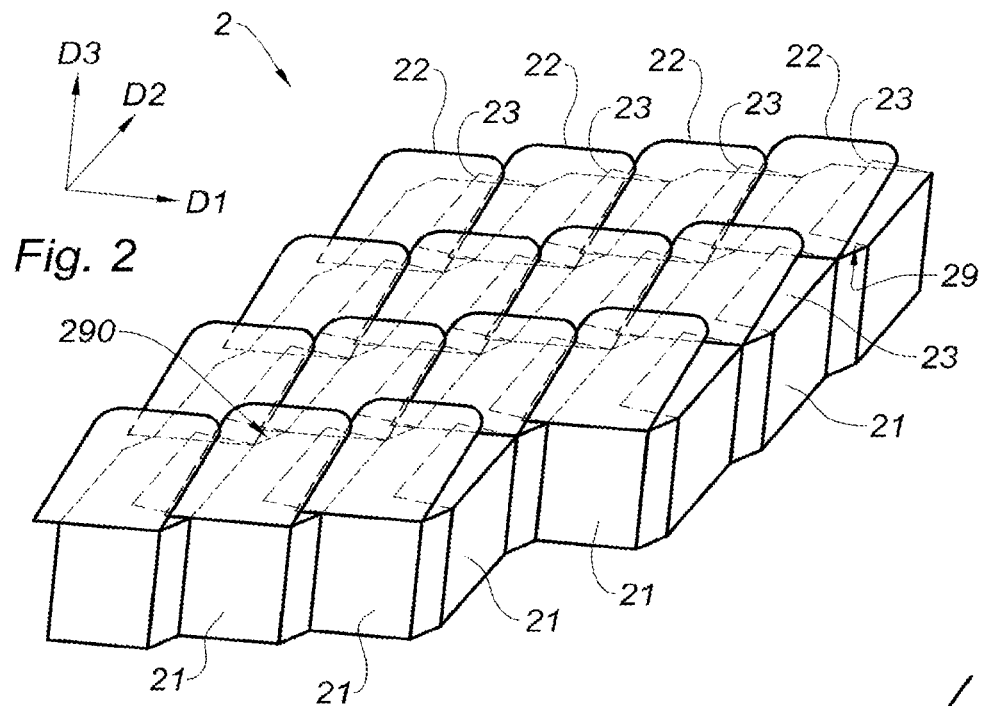
FIG. 2 is a partial schematic perspective view of a cellular structure according to the present disclosure.
Figure 3:
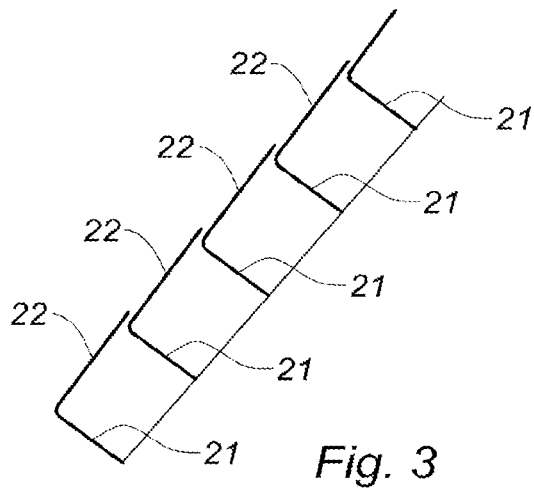
FIG. 3 is a partial schematic side sectional view of the cellular structure of FIG. 2 along a section plane parallel to the plane D2-D3.
Figure 4:
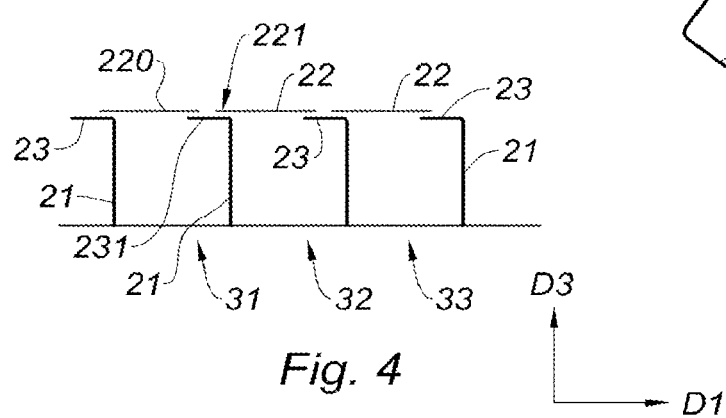
FIG. 4 is a partial schematic side sectional view of the cellular structure of FIG. 2 along a section plane parallel to the plane D1-D3.

FIGS. 2 to 4 show an example of a cellular structure 2 in accordance with the present disclosure.

The cellular structure 2 comprises lateral partition walls 21 forming channels each extending between a first end and a second end. Referring to FIG. 4, which shows the cellular structure 2 of FIG. 2 in section along a section plane parallel to the plane D1-D3, the first end is located towards the top of FIG. 4 and the second end is located towards the bottom of FIG. 4. In this example, the channels 31-33 formed by the lateral partition walls 21 extend along a transverse direction D3 and some lateral partition walls delimit two adjacent channels.

Without limitation, the lateral partition walls 21 may be assembled together by gluing or soldering or welding.

According to the present disclosure, the cellular structure 2 further comprises skin elements 22 and 23 arranged so that each channel is at least partially closed at its first end by at least one skin element, in this case by two skin elements 22 and 23. Each channel thus closed forms an open cell at its second end.

In the example of FIGS. 2 to 4, each represented channel is partially closed at its first end, on the one hand by a first skin element 22 specific to the channel and, on the other hand, by a second skin element 23 specific to the channel. In particular, with reference to FIG. 4 which shows three channels 31, 32 and 33, each of the channels 31 and 33 being adjacent to the channel 32, the channel 31 is partially closed at its first end, on the one hand by a first skin element 220 (similar to the other skin elements 22) specific to the channel and, on the other hand, by a second skin element 231 (similar to the other skin elements 23) specific to the channel.

In this example, each represented channel is also partially closed by a first skin element 22 of a channel adjacent to the channel, in this case by a portion 221 of said first skin element 22 of the adjacent channel, the adjacent channel corresponding in this example to the channel 32 (see FIG. 4).

The partial closure of the channels by a first skin element 22 of an adjacent channel is in this example useful because of the shape of these channels each comprising more than four lateral partition walls 21. As appears in FIG. 2 in which reference is made to the channel located at the top right of this figure, the closure by the skin elements 22 and 23 of the channel is partial since the skin elements 22 and 23 of the channel define an opening 29. Thus, the opening 29 of the channel could be closed by a first skin element 22 of an adjacent channel (not represented) which would be located to the right of the channel. Such a closure is for example, for another channel illustrated in FIG. 2, designated by the reference 290.

The cellular structure 2 of FIG. 2 is thus covered with a discontinuous skin extending over the whole structure by the concatenation or aggregation of the skin elements 22, 23.

Figure 5:
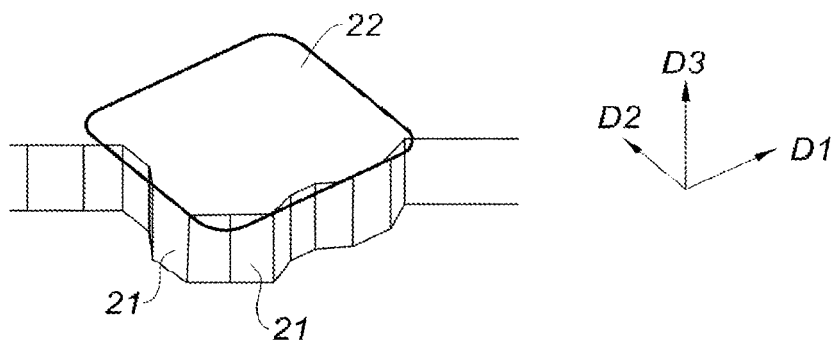
FIG. 5 is a partial schematic perspective view of a channel of a cellular structure according to the present disclosure.

In the example of FIG. 5, the single channel represented in this figure is closed at its first end by one single skin element 22.

Moreover, each skin element 22, 23 is connected to a respective lateral partition wall.

More specifically, each channel of the cellular structure of FIGS. 2 to 4 comprises two skin elements 22 and 23 connected to a respective lateral partition wall of the channel, whereas each channel of the cellular structures of FIGS. 5 to 8 comprises one single skin element 22 connected to a lateral partition wall of the channel.

Several types of connection between skin element and lateral partition wall are herein considered without limitation.

A first type of connection includes fastening each skin element 22 and/or 23 to a respective lateral partition wall, for example by welding or riveting or bolting or crimping or even gluing (not represented). The skin element can in this example be an affixed element.

Figure 9:
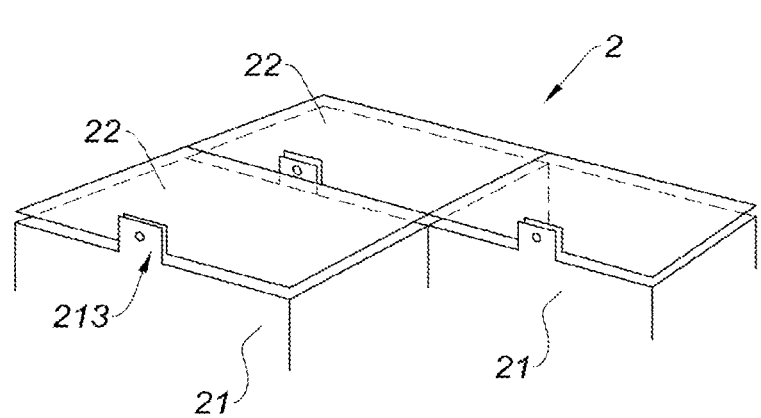
FIG. 9 is a partial schematic perspective view of lateral partition walls and skin elements of a cellular structure according to the present disclosure.
Figure 10:
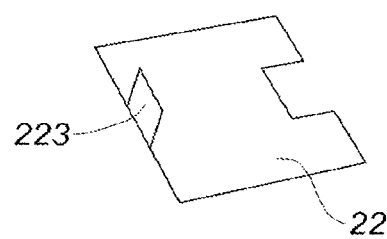
FIG. 10 is a schematic perspective view of a skin element of a cellular structure according to the present disclosure.

In the form of FIGS. 9 and 10, the skin element 22 comprises a leg 223 arranged to be fastened to a leg 213 of a lateral partition wall 21. Such a skin element 22 can be fastened to a corresponding lateral partition wall 21 for example by riveting, punching, gluing, brazing, welding, or else clipping their respective fastening leg 213 and 223.

A second type of connection includes making the skin element 22 and the lateral partition wall 21 to which it is connected in one single piece.

Figure 7:
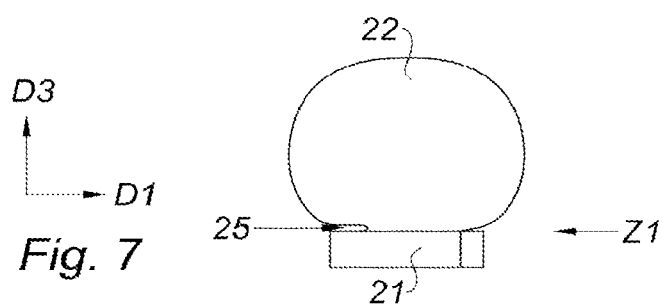
FIG. 7 is a partial schematic side view of a channel of a cellular structure similar to that of FIG. 6 in which the skin element of the channel is represented unfolded.

FIG. 7 illustrates such a type of connection by showing a channel of a cellular structure comprising a skin element 22. The skin element 22 is made in one single piece with a lateral partition wall 21 of the channel. In this example, the skin element 22 is represented "unfolded" so that the closure of the channel involves "folding" the skin element 22 at the level of a fold area Z1.

Figure 8:
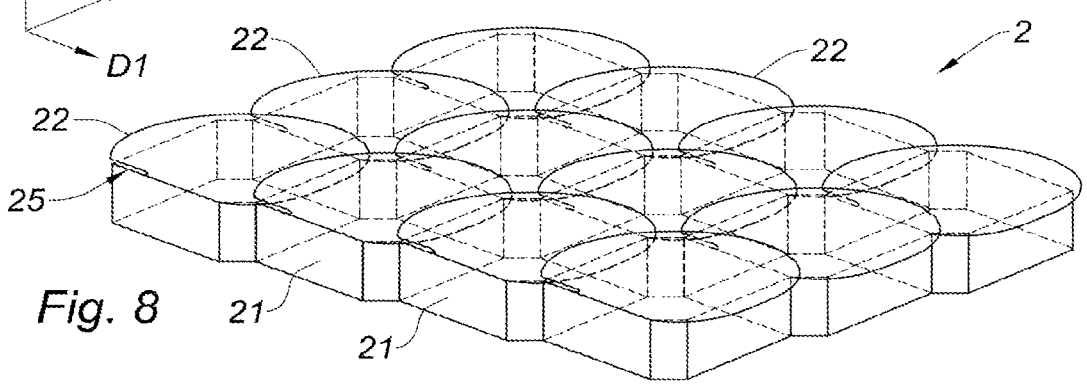
FIG. 8 is a partial schematic perspective view of a cellular structure similar to that of FIG. 6.

FIG. 8 shows a cellular structure 2 comprising channels similar to the channel in FIG. 7, the skin elements 22 being folded so as to close corresponding channels.

If a skin element 22 is folded with respect to a lateral partition wall 21 with which it forms one single piece (second type of connection described hereinabove), it is possible to overfold the skin element 22 when assembling the cellular structure 2 so that the angle formed by the skin element 22 and the lateral partition wall 21 is smaller than 90°. Such an overfolding creates a spring effect and makes it possible to hold the skin element 22 pressed against one or several lateral partition wall(s) 21 of the channel closed thereby and/or against one or several adjacent skin element(s).

When the skin element 22 is attached (first type of connection described hereinabove), it can have a slightly convex shape so as to promote such a spring effect and thus hold the skin element 22 pressed against one or several lateral partition wall(s) 21 of the channel closed thereby and/or against one or several adjacent skin element(s).

According to the present disclosure, each skin element 22, 23 connected to a respective lateral partition wall 21 is movable relative to the other lateral partition walls 21 and in one form relative to the other skin elements 22, 23 in any longitudinal direction D1, D2. In this example, the skin elements 22, 23 are parallel to the directions D1 and D2 (see for example FIG. 8).

In particular, for each channel, at least one skin element 22 is connected to a respective lateral partition wall 21 of the channel and is not fastened to the other lateral partition walls 21 of the channel.

These features come out directly from FIG. 7 which shows a skin element 22 connected to a lateral partition wall 21 so that it can be folded with respect to the lateral partition wall 21. Thus, such a skin element 22 is not fastened to the other lateral partition walls of the channel and of a cellular structure comprising such a channel.

Furthermore, when a skin element 22 is folded so as to close a channel, as illustrated in FIG. 8, a skin element 22 can be covered by another skin element 22 and thus be immobilized transversely (in the direction D3) against the lateral partition walls 21 of the channel closed thereby and to which it is not fastened. Such a skin element 22 can therefore be immobile with respect to these lateral partition walls 21 in the transverse direction D3 of the cellular structure 2. Nonetheless, such a skin element 22 remains movable relative to these lateral partition walls 21 along a longitudinal direction D2 and/or D1 of the cellular structure 2.

In the case of mutual coverage of skin elements 22, for example when a given skin element 22 that is connected to a lateral partition wall 21 of a first channel is covered by at least one skin element 22 connected to a lateral partition wall 21 of a second channel adjacent to the first channel, a notch 25 may be made between the skin element 22 and the lateral partition wall 21 to which it is connected (see FIGS. 7 and 8). Such a notch 25 allows on the one hand receiving an adjacent skin element 22 and, on the other hand, immobilizing it in the transverse direction D3 and enabling it to slip in the directions D1 and D2.

Figure 6:
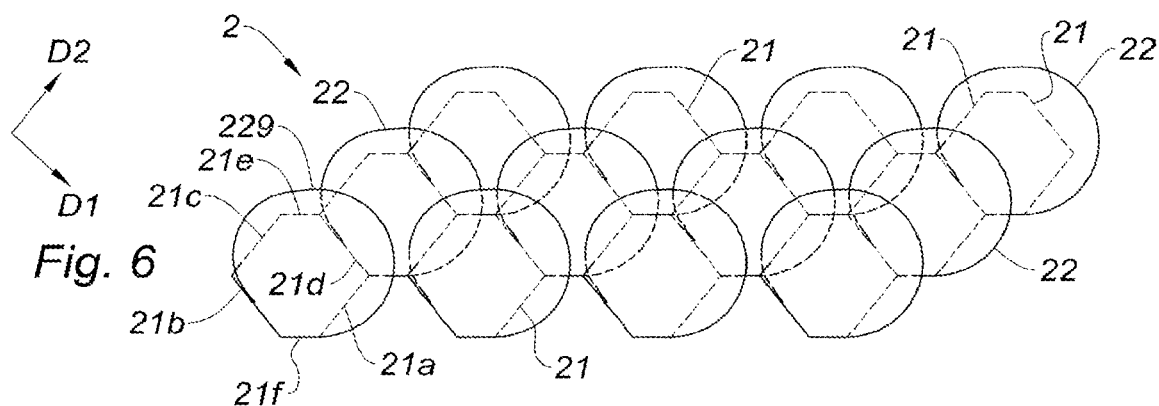
FIG. 6 is a partial schematic top view of a cellular structure according to the present disclosure.

In this way, the skin elements 22 can be nested with one another according to the examples of FIGS. 6 and 8.

Referring to FIGS. 2 to 4, when a channel is at least partially closed by two skin elements 22 and 23 specific to the channel, these skin elements 22 and 23 can, at least partially, be superimposed. See for example the channel 33 of FIG. 4 where the first skin element 22 of the channel 33 partially covers the second skin element 23 of the channel 33.

In addition, a portion of a skin element 22 of a first channel can cover a portion of at least one other skin element 22 and/or 23 of at least one second channel adjacent to the first channel.

Thus, in the example of FIG. 4, the portion 221 of the skin element 22 of the channel 32 covers a portion of the skin element 231 of the channel 31 adjacent to the channel 32.

The cellular structure 2 of FIG. 8 also shows a coverage of each skin element 22 by at least one other skin element 22.

Regarding the arrangement of the lateral partition walls 21, numerous geometries of channels may be made without departing from the scope of the present disclosure.

In the example of FIG. 6, each channel is delimited by six lateral partition walls 21a to 21f (see the channel located at the bottom to the left of this figure). In this example, the lateral partition walls 21a to 21d have a larger surface area than the lateral partition walls 21e and 21f.

In this example, the skin element 229 (similar to the other skin elements 22 of the structure of FIG. 6) is connected to the lateral partition wall 21b. The lateral partition walls 21e and 21f herein constitute "nodal joints," each nodal joint of a channel being arranged to be connected to a nodal joint of an adjacent channel.

When the cellular structure 2 comprises nodal joints, two nodal joints can be fastened together by gluing, brazing, welding, riveting by rivet or by punching, or any known assembly method.

In one form, the cellular structure 2 may be arranged so that two adjacent lateral partition walls 21 of two respective adjacent channels are not coplanar. Thus, for example, each of the two channels represented at the bottom to the left of FIG. 8 comprises a lateral partition wall 21 located at a different coordinate along D2. In other words, a plane containing the lateral partition wall 21 of one of these channels is different from a plane containing the lateral partition wall 21 of the other one of these channels, these two planes in the case could be parallel to the plane D1-D3.

In the example of FIG. 5, the channel comprises lateral partition walls 21 forming multiple facets.

Figure 11:
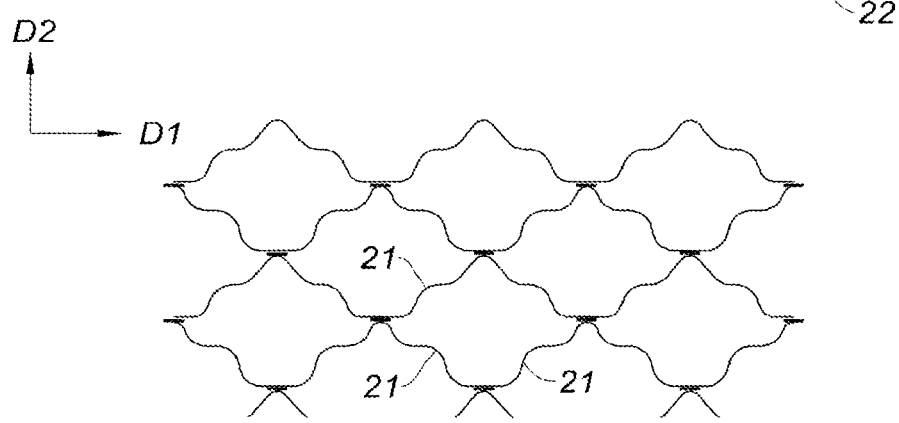
FIG. 11 is a partial schematic top view of lateral partition walls of a cellular structure according to the present disclosure.
Figure 12:
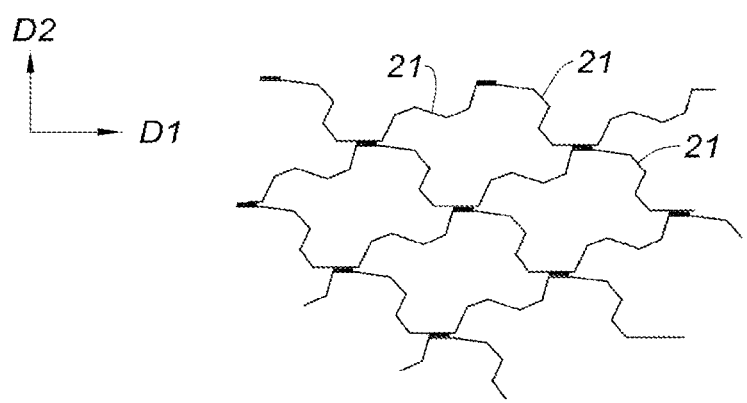
FIG. 12 is a partial schematic top view of lateral partition walls of a cellular structure according to the present disclosure.
Figure 13:
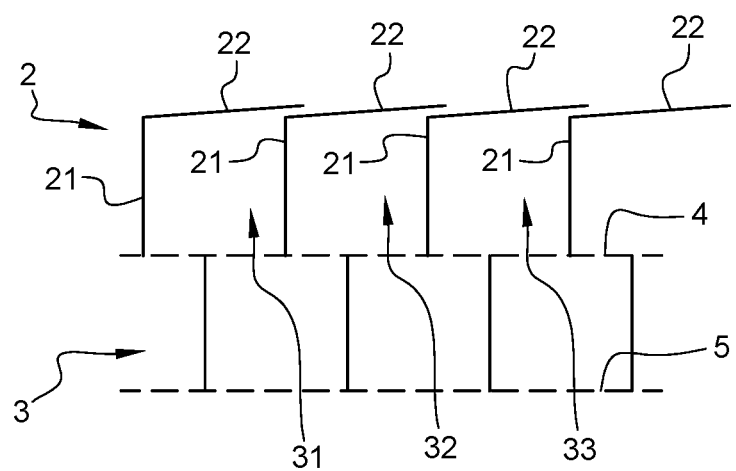
FIG. 13 is a partial schematic view of the acoustic attenuation device according to the present disclosure.

FIGS. 11 and 12 illustrate other shapes or arrangements of lateral partition walls 21 forming corrugated walls or angled facets therebetween.

In the previous examples of cellular structure 2, each channel is open at its second end.

More specifically, in one form, each channel constitutes a portion of a Helmholtz cavity arranged to attenuate a noise generated by an aircraft turbojet engine or turbomachine when the channel is at least partially closed at its second end.

Such a cellular structure 2 can therefore be assembled with a continuous skin (not represented) at least partially closing the channels at their second end so as to constitute an acoustic attenuation device for an aircraft propulsion unit (turbojet engine or turbomachine) nacelle.

To this end, at least the following two alternatives may be implemented:

First alternative: the continuous skin (not represented) may be arranged to let acoustic waves penetrate into the channels of the cellular structure 2, for example throughout orifices made in the continuous skin.

According to this first alternative, each channel constitutes a Helmholtz cavity having a cavity bottom constituted by the discontinuous skin, by at least one skin element.

Second alternative: at least one portion of the skin elements 22 and/or 23 of the cellular structure 2 may be arranged to let acoustic waves penetrate into the channels of the cellular structure 2, for example throughout orifices (not represented) made in these skin elements 22 and/or 23. According to this second alternative, each channel constitutes a Helmholtz cavity having a cavity bottom constituted by said continuous skin (not represented).

Such an acoustic attenuation device may comprise several combinations of materials.

For example, the cellular structure 2 may comprise a metallic material and the continuous skin (not represented) may comprise a composite material. In this case, the cellular structure 2 and the continuous skin (not represented) may be glued to each other.

As another example, the cellular structure 2 may comprise titanium or a titanium alloy, or else comprise nickel or a nickel alloy, and the continuous skin (not represented) may comprise a ceramic material, in particular a composite material with a ceramic matrix, in particular a composite material with ceramic fibers and a ceramic matrix from the family of aluminum oxides. In this case, the cellular structure 2 and the continuous skin (not represented) may be glued to each other with a ceramic glue. For example, it is possible to use glues from the CERAMABOND® family or a mix of a pre-ceramic resin and alumina fillers which will then be consolidated through a thermal cycle.

Fastening of the cellular structure 2 with the continuous skin (not represented) may be carried out in multiple alternative or complementary ways, including the use of through fasteners, gluing, brazing, etc.

Of course, the present disclosure is not limited to the examples that have just been described and many arrangements may be made to these examples without departing from the scope of the present disclosure. For example, if it is desired in particular to facilitate the fastening of the skin elements or the manufacture of the cellular structure while retaining the principle of the present disclosure, an arrangement of the examples described hereinabove may include arranging the skin elements so that:

each channel of a first series of channels is at least partially closed at its first end by at least one skin element specific to the channel, that is to say by at least one skin element at least partially closing the channel alone, and/or several groups of channels of a second series of channels are at least partially closed at their first end by the same respective skin element, that is to say that a skin element can at least partially close several channels of such a group (not represented).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cellular structure for an acoustic attenuation device for an aircraft propulsion unit nacelle, the cellular structure comprising:

lateral partition walls forming channels, each channel extending between a first end and a second end of the channel; and a discontinuous skin consisting of a plurality of skin elements, the plurality of skin elements arranged such that the first end of each channel is at least partially closed by at least one of the plurality of skin elements, wherein each skin element is connected to only one of the lateral partition walls and is movable relative to each of the other lateral partition walls, wherein each lateral portion wall is connected to at most one of the plurality of skin elements, wherein the discontinuous skin is arranged to at least partially close the first ends of the channels.

2. The cellular structure according to claim 1, wherein each of the plurality of skin elements is fastened to a respective lateral partition wall by welding, riveting, bolting, crimping, or gluing.

3. The cellular structure according to claim 1, wherein each of the plurality of skin elements forms one single piece with the lateral partition wall to which it is connected.

4. The cellular structure according to claim 1, wherein the first end of each channel is at least partially closed by a first skin element and a second skin element.

5. The cellular structure according to claim 4, wherein, for each channel, the first skin element and the second skin element are at least partially superimposed.

6. The cellular structure according to claim 1, wherein a portion of the at least one skin element of a first channel covers a portion of at least one other skin element of at least one second channel adjacent to the first channel.

7. The cellular structure according to claim 1, wherein each channel is delimited by at least four lateral partition walls.

8. The cellular structure according to claim 1, wherein two adjacent lateral partition walls of two respective adjacent channels are not coplanar.

9. The cellular structure according to claim 1, wherein, for each channel, at least one lateral partition wall comprises corrugated walls or angled facets.

10. The cellular structure according to claim 1, wherein each channel constitutes a portion of a Helmholtz cavity arranged to attenuate a noise generated by an aircraft propulsion unit when the channel is at least partially closed at the second end.

11. An acoustic attenuation device for an aircraft propulsion unit nacelle, wherein the acoustic attenuation device comprises a cellular structure according to claim 1 and a continuous skin closing at least partially the channels of the cellular structure at the second end.

12. The acoustic attenuation device according to claim 11, wherein the continuous skin is arranged such that acoustic waves penetrate into the channels of the cellular structure, each channel constituting a Helmholtz cavity having a cavity bottom formed by at least one of the plurality of skin elements.

13. The acoustic attenuation device according to claim 11, wherein at least one portion of the plurality of skin elements of the cellular structure is arranged to let acoustic waves penetrate into the channels of the cellular structure, each channel constituting a Helmholtz cavity having a cavity bottom formed by the continuous skin.

14. The acoustic attenuation device according to claim 11, wherein the cellular structure comprises a metallic material and the continuous skin comprises a composite material, the cellular structure and the continuous skin being glued to each other.

15. The acoustic attenuation device according to claim 11, wherein the cellular structure comprises titanium or a titanium alloy or nickel or a nickel alloy, and the continuous skin comprises a ceramic material, the cellular structure and the continuous skin being glued to each other with a ceramic glue.

16. An acoustic attenuation device for an aircraft propulsion unit nacelle, wherein the acoustic attenuation device comprises:
- a first cellular structure according to claim 1;
- a second cellular structure comprising channels, each channel extending between a first end and a second end of the channel;
- at least one septum arranged to separate the first and the second cellular structure so as to at least partially close the channels of the first cellular structure at the second end and the channels of the second cellular structure at the first end; and
- a continuous skin at least partially closing the channels of the second cellular structure at the second end.

17. An aircraft propulsion unit nacelle comprising an acoustic attenuation device according to claim 16.

18. An aircraft propulsion unit nacelle comprising a cellular structure according to claim 1.

19. The cellular structure according to claim 1, wherein each channel is formed by at least six lateral partition walls.

* * * * *